US011128439B2

(12) United States Patent
Mishra

(10) Patent No.: US 11,128,439 B2
(45) Date of Patent: Sep. 21, 2021

(54) SECURE STORAGE OF DATA IN A BLOCKCHAIN

(71) Applicant: Schneider Electric Industries SAS, Rueil Malmaison (FR)

(72) Inventor: Sandeep Kumar Mishra, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 197 days.

(21) Appl. No.: 16/565,777

(22) Filed: Sep. 10, 2019

(65) Prior Publication Data

US 2020/0106601 A1   Apr. 2, 2020

(30) Foreign Application Priority Data

Oct. 1, 2018   (EP) .................................... 18306290

(51) Int. Cl.
*H04L 9/08* (2006.01)
*H04L 9/06* (2006.01)
*G06F 21/60* (2013.01)
*H04L 9/32* (2006.01)

(52) U.S. Cl.
CPC .......... *H04L 9/0637* (2013.01); *G06F 21/602* (2013.01); *H04L 9/0643* (2013.01); *H04L 9/0866* (2013.01); *H04L 9/3247* (2013.01); *H04L 2209/38* (2013.01)

(58) Field of Classification Search
CPC .. G06F 21/602; H04W 12/106; H04L 9/0866; H04L 9/3247; H04L 63/0876; H04L 63/123
See application file for complete search history.

(56) References Cited

U.S. PATENT DOCUMENTS

| | | | |
|---|---|---|---|
| 7,334,125 B1* | 2/2008 | Pellacuru | H04L 9/083 380/277 |
| 2015/0244684 A1* | 8/2015 | Ng | H04L 63/102 713/168 |
| 2017/0134280 A1 | 5/2017 | Davis | |
| 2018/0183587 A1 | 6/2018 | Won et al. | |
| 2019/0020485 A1 | 1/2019 | Uhr et al. | |
| 2019/0036711 A1* | 1/2019 | Qiu | H04L 9/3268 |

FOREIGN PATENT DOCUMENTS

WO   WO 2017/116062   7/2017

OTHER PUBLICATIONS

Extended European Search Report for European Patent Application No. 18306290.0, dated Apr. 2, 2019, 7 pages.

* cited by examiner

*Primary Examiner* — Olugbenga O Idowu
(74) *Attorney, Agent, or Firm* — Locke Lord LLP

(57) ABSTRACT

A method for processing data in a blockchain. It aims at securely storing data issued from devices and going through a service platform by ensuring integrity and authenticity of the data. To this end, a list of device identifiers may by associated with respective decryption means in a blockchain platform. Upon reception of a message comprising encrypted data and comprising a device identifier, the blockchain platform decrypts the first encrypted data using the decryption means that are associated with the device identifier. The decrypted data is then hashed and stored in the blockchain.

13 Claims, 7 Drawing Sheets

SECURE STORAGE OF DATA IN A BLOCKCHAIN

The invention concerns securing and storing data issued from devices, in particular from sensors, in a distributed database such as Blockchain.

Blockchain is a distributed database that consists of an ordered chain of blocks, each block comprising hashed data. A block of index n also comprises the hash value of the data hashed for the previous block of index n−1. The blockchain is then shared among all the nodes of the network and is updated in all the nodes each time a new block is added and validated by all the nodes, via a process called "proof of work" or "proof of stake" or any other validation algorithm. As it is extremely challenging, let us say impossible, to modify the blocks once validated and shared between all the nodes, blockchain ensures integrity of the data stored in all the blocks.

According to prior art solutions, data can be acquired by a sensor, and can then be encrypted using a private key and/or a network key. Alternatively, the data can be transmitted in clear, without being encrypted. Data can then be transmitted by the sensor in a message to a service platform via a network. Data is also identified by a device identifier, device ID, identifying the sensor or device issuing the data and included in the message. The device ID and the network key are generally provided by a chip manufacturer or network provider, and they are embedded in a firmware of the sensor or device.

Once in the network, the message is time stamped, and then partly decrypted using the network key (or remains encrypted if it has been encrypted using the private key only).

The message is then transferred to the service platform, such as an Industrial Internet Of Things, IIOT, platform for example. Such a platform can also be called "cloud" and may be a cloud dedicated to a given business or company.

Before reaching the service platform, the message can go through different intermediate company clouds. Once it reaches the platform, the data, if encrypted, is decrypted by the platform using a public key corresponding to the secret private key of the device. The private and public keys are pre-generated, then the private key is stored in the device and the public key is shared, in particular with the platform.

The data, or payload, of the message is therefore, according to this solution, either poorly encrypted or not encrypted at all, when it reaches the IIOT platform.

The data can then be sent in clear to the blockchain, for example to a smart contract to trigger a decision based on the data. Data is then hashed and added in a new block of the blockchain. A "smart contract" is a contract between peers that is stored in the blockchain so as to ensure that the contract cannot be modified. In addition, the smart contract may comprise triggering conditions that automatically activate some terms of the contract. For example, in a smart contract between an insurance company and a farmer, the smart contract may comprise a clause indicating that the farmer is retributed if there is no rain during 30 consecutive days. Meteorological data can be added to the blockchain and if no rain has been detected during 30 consecutive days, the clause of the smart contract is automatically activated and the farmer is retributed. However, this requires that the meteorological data cannot be corrupted and should be issued by a trusted third party.

There is no solution for ensuring that the data among the platform and the blockchain is not fake data or has not been modified, or for determining whether the platform has been hacked or not. Therefore, the blockchain has no mechanism to check the integrity of data coming from sensors via the service platform.

If the device ID has been hacked and fake data is sent from the platform or from the network to the blockchain, trust and authenticity of smart contract cannot be ensured.

There is therefore a need to ensure the authenticity and integrity of sensor data that are added to the blockchain via a network and a service platform.

To this end, a first aspect of the invention proposes a method for processing data in a blockchain, the method comprising the following steps carried out by a blockchain platform:

storing a list of device identifiers and associated respective decryption means;

receiving a message comprising first encrypted data and a first device identifier;

decrypting the first encrypted data using first decryption means that are associated with the first device identifier;

hashing the first decrypted data and storing the hashed data in the blockchain together with the first device identifier.

As explained hereafter, decryption means may involve signature checking, decryption using cryptographic keys, hash comparison or any combination of these.

As decryption is performed at the blockchain side, this ensures integrity of the device data stored in the blockchain, the first data being encrypted by the device corresponding to the first device identifier.

According to some embodiments, the encrypted data may be received from a service platform and the method may further comprise:

secondly encrypting the first decrypted data using a virtual encryption key;

transmitting the second encrypted data with the first device identifier to the service platform.

The service platform can then use the data to send alert (SMS, e-mail) and notification by comparing the data with a threshold for example. More generally, the service platform provides any service that makes use of the data originating from a device such as a sensor. For example, the service platform may be an IIOT platform or cloud. These embodiments enable to feed the data to both blockchain and service platform in a secure manner.

In complement, the method may further comprise the following steps, prior to the step of receiving the first encrypted data:

generating the virtual encryption key and a corresponding virtual decryption key for each device identifier of the list;

transmitting the virtual decryption keys in association with the respective device identifiers to the service platform.

This ensures integrity of the data that is received by the service platform from the blockchain.

According to some embodiments, the method may further comprise, prior to the step of storing the respective decryption means:

receiving a list of device identifiers;

hashing the device identifiers of the list; and storing the hashed device identifiers in the blockchain.

These embodiments enable to check that the encrypted data is transmitted by a device that is already identified in the blockchain, and therefore avoids processing data from other devices.

As a complement, the method may further comprise transmitting the list of device identifiers to the service platform.

This enables the service platform to avoid processing data from devices that are not in the list.

Alternatively, or in complement, the method may further comprise, upon reception of the list of device identifiers:

generating, for at least one device identifier of the list, at least one encryption key, transmitting said encryption key and given device identifier to a device manufacturer so as to be stored in a firmware of a device corresponding to the given device identifier during manufacturing of the device.

According to some embodiments, the method may further comprise generating, for each given device identifier of the list, decryption means based at least on the encryption key corresponding to said given device identifier.

According to some embodiments the method may further comprise, prior to the step of storing decryption means:

receiving from a device manufacturer a request for a unique code corresponding to a given device identifier;

hashing the given device identifier and verifying that the hashed device identifier corresponds to one of the hashed device identifiers stored in the blockchain;

if the hashed device identifier corresponds to one of the hashed device identifiers stored in the blockchain, generating a unique code corresponding to the given device identifier;

transmitting the unique code to the device manufacturer;

hashing the unique code and storing the hashed unique code in the blockchain in association with the hashed device identifier.

The manufacturer therefore permits the physical identification of the device using the unique code. An attacker that would claim a given device therefore needs to own the physical device.

In complement, the method may further comprise, after the step of hashing the unique code and before receiving the message:

receiving, from a mobile application, a scan of a current unique code printed on a device;

hashing the unique code and verifying that the hashed current unique code corresponds to one of the hashed unique codes stored in the blockchain in association with a given device identifier;

if the hashed current unique code corresponds to one of the hashed unique codes stored in the blockchain in association with a given device identifier, generating a signature associated with the given device identifier based at least on the unique code, hashing said signature and storing the hashed signature in the blockchain, the hashed signature being part of the decryption means.

This enables a user to claim a device and to ensure that the blockchain can then check the authenticity of the messages sent by the device.

In complement, a firmware version number may be received from the mobile application with the scan of the current unique code and the signature may be generated based at least on the unique code and the firmware version number.

This enables to reinforce the security associated with the method and the authenticity of the data that is added to the blockchain.

Alternatively, or in complement, the method may further comprise receiving manufacturing information from a manufacturer of the device, hashing the manufacturing information and storing the hashed manufacturing information in association with the device identifier in the blockchain, the signature being further based on manufacturing information of the device.

This also enables to reinforce the security associated with the method and the authenticity of the data that is added to the blockchain, as the signature is based on multiple factors, which are of different natures (physical and software).

In complement, the manufacturing information may further comprise a unique bar code and an associated manufacturing date.

Alternatively, or in complement, the method may further comprise, after receiving the manufacturing information from the manufacturer:

receiving a request to link a device to a user account, the request comprising current manufacturing information and a device identifier from an application scanning a packaging of the given device;

hashing the current manufacturing information;

if the hashed current manufacturing information corresponds to the hashed manufacturing information stored in association with the device identifier in the blockchain, linking the device identifier with the user account in the blockchain.

It is therefore ensured that the user really owns the device before enabling the device to be claimed in the user account.

In complement, the method may further comprise, after linking the device identifier with the user account in the blockchain, transmitting the device identifier, the manufacturing information and the user account to a service platform.

The user account can therefore be shared between the service platform and the blockchain platform.

According to some embodiments, decrypting the first data using the decryption means may comprise:

generating a current signature based on at least one element of the message comprising the encrypted data;

hashing the current signature;

decrypting the encrypted data in the message only if the hashed current signature matches with the hashed signature previously stored in association with the first device identifier in the blockchain.

This allows to decrypt the data only if the source of the message has been authenticated and it therefore reinforces the efficiency and security of the method.

According to some embodiments, the current signature may be further generated based on the manufacturing information and/or the unique code stored in association with the first device identifier in the blockchain.

According to some embodiments, the at least one element may comprise a private key or a firmware version number.

A second aspect of the invention concerns a computer program executable by a processor and comprising instructions for, when executed by the processor, carrying out the steps of a method according to the first aspect of the invention.

A third aspect of the invention concerns a non-transitory computer readable storage medium, with a computer program stored thereon, said computer program comprising instructions for, when executed by a processor, carrying out the steps of a method according to the first aspect of the invention.

A fourth aspect of the invention concerns a blockchain platform comprising:

a database storing respective decryption means in association with device identifiers;

a network interface configured for receiving encrypted data with a first device identifier;

a processor configured for decrypting the encrypted data using the decryption means associated with the first device identifier in the database;

hashing the first decrypted data and storing the hashed data in the blockchain together with the first device identifier.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

Figure 1:
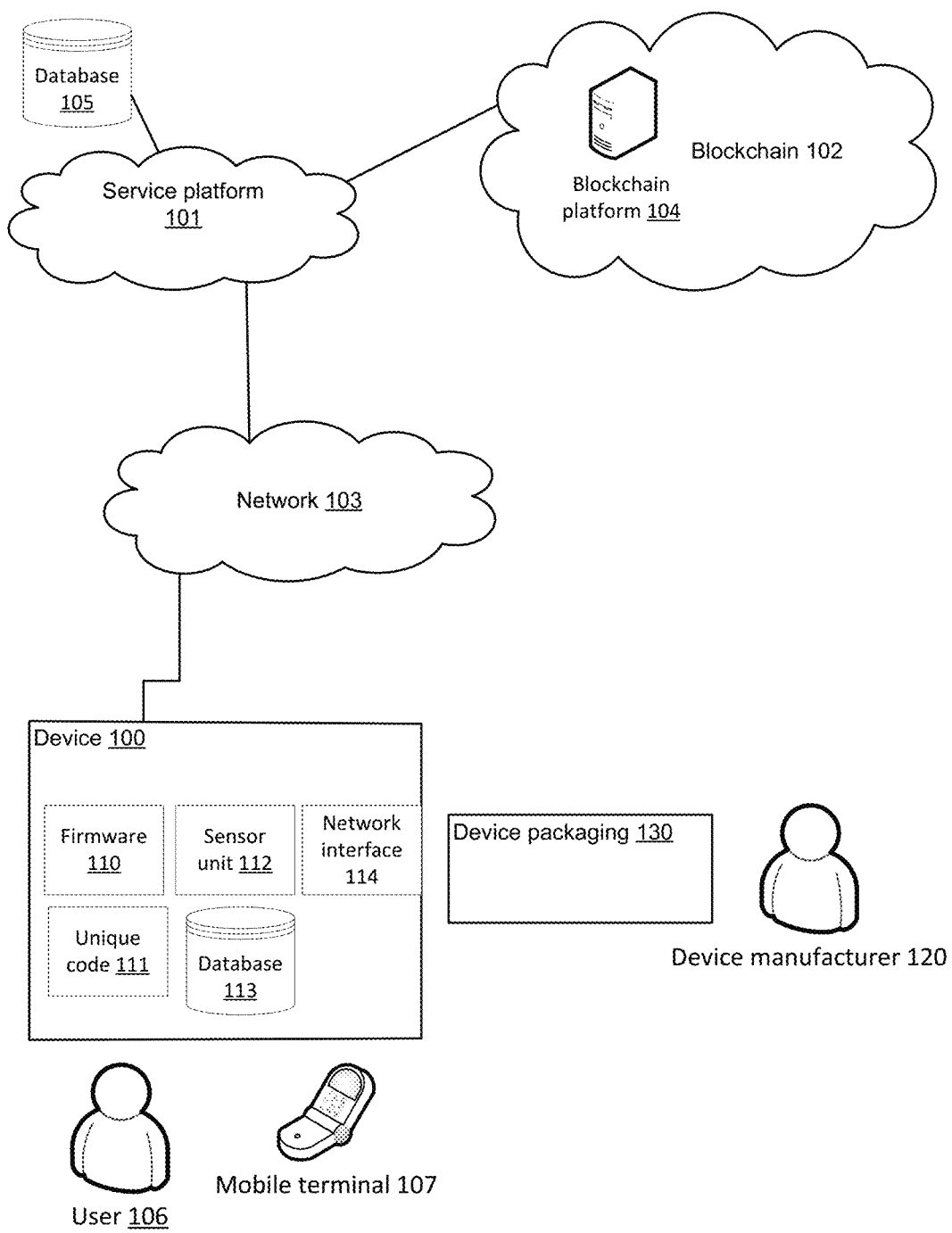
FIG. 1 represents a system according to some embodiments of the invention.

FIG. 1 shows a system according to some embodiments of the invention.

The system comprises a service platform 101 and a blockchain 102 associated with a blockchain platform 104, communicating via a communications network, such as an IP network for example. As commonly known, the blockchain 102 corresponds to a chain of blocks distributed between a plurality of nodes. The blockchain platform 104 is one of these nodes, and can initiate changes in the blockchain 102, in accordance with the rules that are specific to the blockchain 102.

The service platform 101 can be for example an Internet of Things, IoT platform, in charge of collecting and processing data issued from IoT devices 100 such as sensors. The collected data can also be associated with a respective user account. The IoT devices 100 may be Industrial IoT, IIoT, devices, which are arranged for collecting data in industrial buildings/premises.

The blockchain platform 104 can be regarded as an interface between the service platform 101 and the blockchain 102 (and/or between the device 100 and the blockchain 102).

No restriction is attached to the service platform 101, which encompasses any platform in charge of a given service retrieving data from devices (gaming platform, commercial platform, banking platform, etc.). In what follows, the service platform 101 is also called service cloud.

The service platform may access a database 105, storing user accounts in association with device identifiers. The database 105 may also store cryptographic keys as will be explained hereafter.

The service platform 101 may be accessed by a device 100 (among a plurality of devices, such as sensors for example, or any other electronic device) via a network 103.

No restriction is attached to the network, which can be a Low Power Wireless Access Network, LPWAN, such as a NarrowBand IoT, NBIoT network or a Sigfox network, which are advantageous in the context of a device 100 being a sensor. The network 103 can alternatively be a Long Term Evolution, LTE, network.

The service platform 101 may be accessed via intermediate platforms, such as intermediate company clouds, for example if the service of the service platform 101 is provided by several vendors. In that case, the intermediate platforms may forward the messages intended to the service platform 101.

The device 100 comprises a network interface 114 configured for accessing the network 103 and for transmitting data through the network. In particular, the network interface 114 is preferably a wireless interface, for communicating according to the LPWAN, NBIoT or LTE specifications for example.

The device 100 further comprises:
- a firmware 110, which is a permanent software stored in memory. This software enables to perform the function of the device, such as sensing data and processing it in the context of a device 100 being a sensor. The firmware 110 is associated with firmware details such as a version number;
- a sensor unit 112 arranged for sensing data. This unit is optional as the device 100 may be other than a sensor. For example, the device 100 may be a device collecting data from other devices (sensors) and processing it;
- a unique code 111 uniquely identifying the device 100. The unique code may be physically tied to the device. For example, as detailed hereafter, the unique code may be a QR code printed on the device 100; and
- a database 113, which may be a secure database. The secure database may be included in a security module (hardware for example). The database 113 may store a network key shared with the network 103, and at least one encryption key. The encryption key may be based on a pair of public/private keys (asymmetric cryptography) of the device 100. Alternatively, the encryption key may be based on symmetric cryptography. In what follows, we consider the example of the encryption key being a private key of the device 100. The database 113 may also store a platform security key, which is shared with the service platform 101.

No restriction is attached to what is meant by sensor. Sensor encompasses any entity that is configured to retrieve environmental data, such as an ambient temperature, humidity, shock. A sensor also encompasses level sensors, quality sensors, geo-localization sensors, etc. A level sensor encompasses any sensor measuring a liquid volume, such as a sensor in a tank. A quality sensor encompasses any sensor measuring environmental quality, such as $CO_2$ concentration or air quality.

As mentioned above, only the exchanges between the device 100 and the service platform 101 are secure according to the known prior art solutions. However, according to these solutions, data is transferred in clear between the service platform 101 and the blockchain 102, which leads to integrity and security problems.

The device 100 may belong to a user 106, which may be a person or an entity. A mobile terminal 107, such as a Smartphone or a touchpad may also be located on the user's side, as will be detailed hereafter. The mobile terminal 107 encompasses any terminal that comprises means for accessing the service platform 101 and the blockchain 102 via the network 103 or via another communication path, and that comprises means for scanning data (a camera for example). For example, if the network 103 is a LWPAN network, the mobile terminal may use a LTE network distinct from the network 103.

The system may also include a device packaging 130 provided with the device 100 during commissioning. The device packaging 130 may comprise manufacturing information such as a packaging barcode and a manufacturing date and time. The device packaging 130 may also comprise a product type, indicating that the device 100 is a temperature sensor, or a humidity sensor, etc.

The device packaging 130 and the device 100 may be manufactured by a device manufacturer 120.

Figure 2:
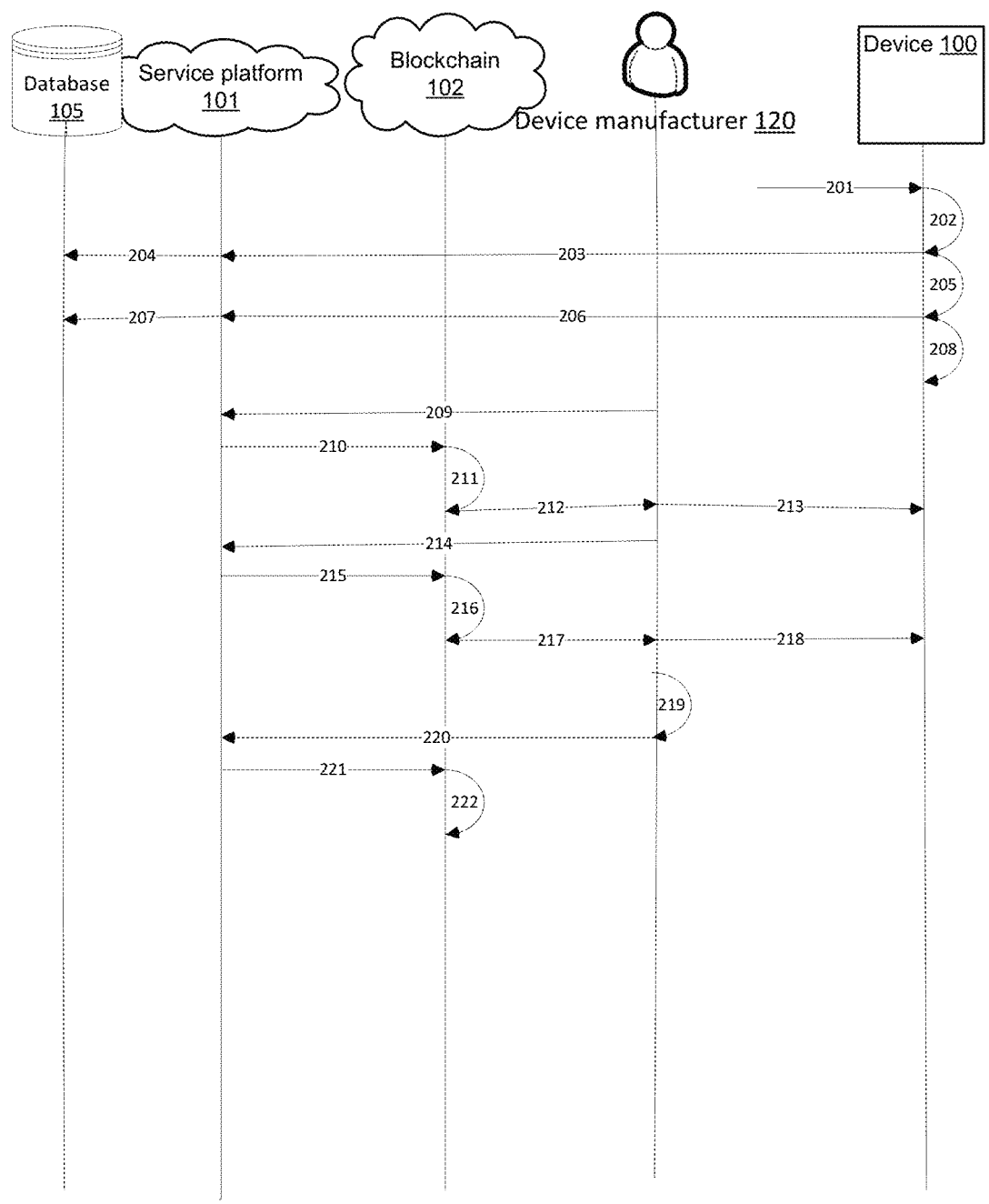
FIG. 2 shows the steps of a method according to the invention implemented in the system of FIG. 1, during a first phase of the invention.

FIG. 2 shows the steps of a method according to the invention implemented in the system of FIG. 1, during a first phase of the invention.

The first phase corresponds to a preliminary phase, before the device 100 is purchased and claimed by the user 106.

At step 201, a list of device identifiers is received by the blockchain platform 104. The list can for example be received from the manufacturer 120 or from any secure entity that ensures the uniqueness of the identifiers in the list. The list may correspond to devices that are expected to be manufactured by the manufacturer 120 or by several manufacturers.

At step 202, the identifiers of the list are hashed and stored in the blockchain 102. No restriction is attached to the hash function that is used in the blockchain 102. For example, the hash function can be a SHA function, such as SHA-256 for example.

At step 203, the list of device identifiers is transmitted to the service platform 101 so as to be stored in the database 105 at step 204.

At step 205, a virtual encryption key and a virtual decryption key are generated by a computational algorithm of the blockchain platform 104 for each device identifier of the list. The encryption and decryption keys may correspond to a pair of public and private keys for example. The wording "virtual" is used here merely to distinguish the encryption performed at the blockchain level from the encryption performed at the device 100 level. Therefore, any alternative wording can be used to distinguish the encryption performed by the blockchain from the encryption performed by the device 100.

At step 206, the blockchain platform 104 transmits, in correspondence to each of the device identifiers, a virtual decryption key to the service platform 101 for storage in the database 105.

At step 207, the service platform 101 stores the virtual decryption keys in association with their respective device identifiers in the database 105.

At step 208, a computational algorithm of the blockchain platform 104 generates, for each device identifier of the list, an encryption key, such as a private key. At the same time, the blockchain platform generates decryption means based on the encryption key. No restriction is attached to the decryption means which can be a function of the encryption key. For example, the decryption means can be a hash of the encryption key and of a constant value. Alternatively, the decryption means may be a public key corresponding to the private key of the device 100. The decryption means may also correspond to a signature checking or be based both on signature checking and cryptography mechanisms, as explained hereafter. The decryption means may also take into account manufacturing information and firmware information, as will be explained hereafter.

At step 209, the manufacturer 120 sends a request to the service platform 101, the request comprising at least one device identifier (such as the device identifier of the device 100 illustrated on FIG. 1). The request is forwarded by the service platform 101 to the blockchain platform 104 at step 210.

At step 211, the blockchain platform 104 hashes the received identifier and checks whether the hash corresponds to one of the hashed device identifiers previously stored in the blockchain 102 at step 202. If the hash does not correspond to any of the hashed device identifiers previously stored, an error message is transmitted to the manufacturer 120, requesting to input a new device identifier for example. Else, if the hash does correspond to one of the hashed device identifiers previously stored, the blockchain platform 104 retrieves the keys associated with the device identifier and transmits them, at step 212, to the device manufacturer 120 (optionally through the service platform 101).

At step 213, during manufacturing of the device 100 by the manufacturer 120, the manufacturer 120 stores the keys received from the blockchain platform 104, in the firmware of the device 100.

At step 214, a request for a unique code is transmitted by the device manufacturer 120 to the service platform 101, the request comprising at least one device identifier (such as the device identifier of the device 100 illustrated on FIG. 1). At step 215, the request is forwarded to the blockchain platform 104.

At step 216, the blockchain platform 104 hashes the received device identifier and checks whether the hash corresponds to one of the hashed device identifiers previously stored in the blockchain 102 at step 202. If the hash does not correspond to any of the hashed device identifiers previously stored, an error message is transmitted to the manufacturer 120, asking for a new device identifier. Else, if the hash does correspond to one of the hashed device identifiers previously stored, the blockchain platform 104 generates a unique code associated with the device identifier and transmits it, at step 217, to the device manufacturer 120 (optionally through the service platform 101). The unique code may be a QR code corresponding to the device identifier but can also be a bar code or any other code. The unique code is then hashed and stored in the blockchain 102 in association with the device identifier at step 216.

The QR code can be printed at step 218 on the device 100 by the manufacturer 120. The version number of the firmware may also be printed on the device packaging 130 according to some embodiments.

It is to be noted that, alternatively, the device manufacturer 120 may send a unique request to obtain the keys and the unique code. In that case, steps 209 to 212 and steps 214 to 217 are grouped and performed together.

At step 219, the device manufacturer 120 manufactures the device packaging 130 for the device 100. The device manufacturer 120 further prints manufacturing information on the device packaging. The manufacturing information may comprise any combination of the following elements:
a packaging barcode;
a manufacturing date and time;
a serial number; and
a device or product type.

At least some of the manufacturing information may be transmitted at step 220 by the device manufacturer 120 to the service platform 101, which forwards the manufacturing information to the blockchain platform 104 at step 221. The manufacturing information is then hashed and stored in the blockchain 102 at step 222, in association with the device identifier.

Figure 3:
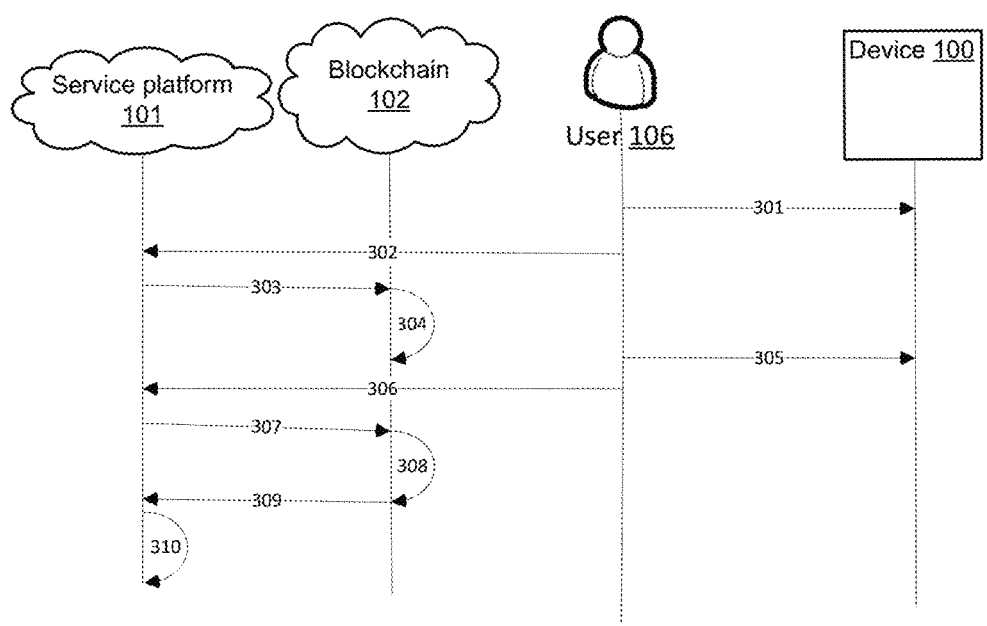
FIG. 3 shows the steps of a method according to the invention implemented in the system of FIG. 1, during a second phase of the invention.

FIG. 3 shows the steps of a method according to the invention implemented in the system of FIG. 1, during a second phase of the invention.

The second phase corresponds to a phase of claiming, also referred to as pairing, of the device 100 by the user 106. This means that the user 106 wants to add the device 100 to his user account. The user account may have been created in a preliminary phase, prior to the second phase, with the service platform 101. As it will be understood, the user may claim several devices to be associated with his user account.

At step 301, the user 120 scans the unique code printed on the device 100, using the mobile terminal 107 for example. For example, the scanning function can be integrated to a mobile application dedicated to the service platform 101 and/or to the blockchain 102. This can be regarded as sending a request to link the device 100 with an account of the user.

The unique code is transmitted to the service platform 101 at step 302 and to the blockchain 102 at step 303. At step 304, the blockchain platform 104 hashes the unique code and compares the hash with the hashed unique code previously stored in the blockchain 102 at step 216 of the first phase. If the hash corresponds to a hashed unique code previously stored, then the device 100 is commissioned at step 304. Else, the device 100 is not commissioned and an error message can be sent to the mobile terminal 107.

According to another embodiment, the user 120 may scan several unique codes of several devices 100 during the second phase, and the unique codes are transmitted to the blockchain 102. The blockchain platform 104 may then hash individually the unique codes to sequentially compare them with the hashed unique codes stored in the blockchain 102. Alternatively, the blockchain 102 stores hashed lists (or sub-lists) of unique codes and, in that case, the unique codes received from the user 120 are collectively hashed and compared with the hashed lists stored in the blockchain.

The user 106 also scans at step 305 manufacturing information printed on the device packaging 130, using the mobile terminal 107. Again, an application installed on the mobile terminal 107 may be used to scan the manufacturing information. This can also be regarded as sending a request to link the device 100 with an account of the user.

The manufacturing information is then transmitted to the service platform 101 at step 306 and to the blockchain 102 at step 307.

At step 308, the blockchain platform 104 hashes the manufacturing information and compares the hash with the hashed manufacturing information previously stored in the blockchain at step 222. If the hash corresponds to some hashed manufacturing information previously stored, then a signature is generated for the device 100. The signature can be based on any combination of the manufacturing information, the unique code and the version number of the firmware 110. The signature is then hashed and stored in the blockchain in association with the device identifier.

Once the device 100 is commissioned and/or the manufacturing information has been received and validated by the blockchain platform 104, the blockchain platform 104 may link the account of the user with the device 100 and may indicate to the service platform 101 that the device 100 can be linked with the user account at step 309. The service platform 101 can then link, at step 310, the manufacturing information with the device identifier and the user account in the database 105. A user account may be associated with several device identifiers and manufacturing information, but each claimed device is associated with a single user account.

Figure 4:
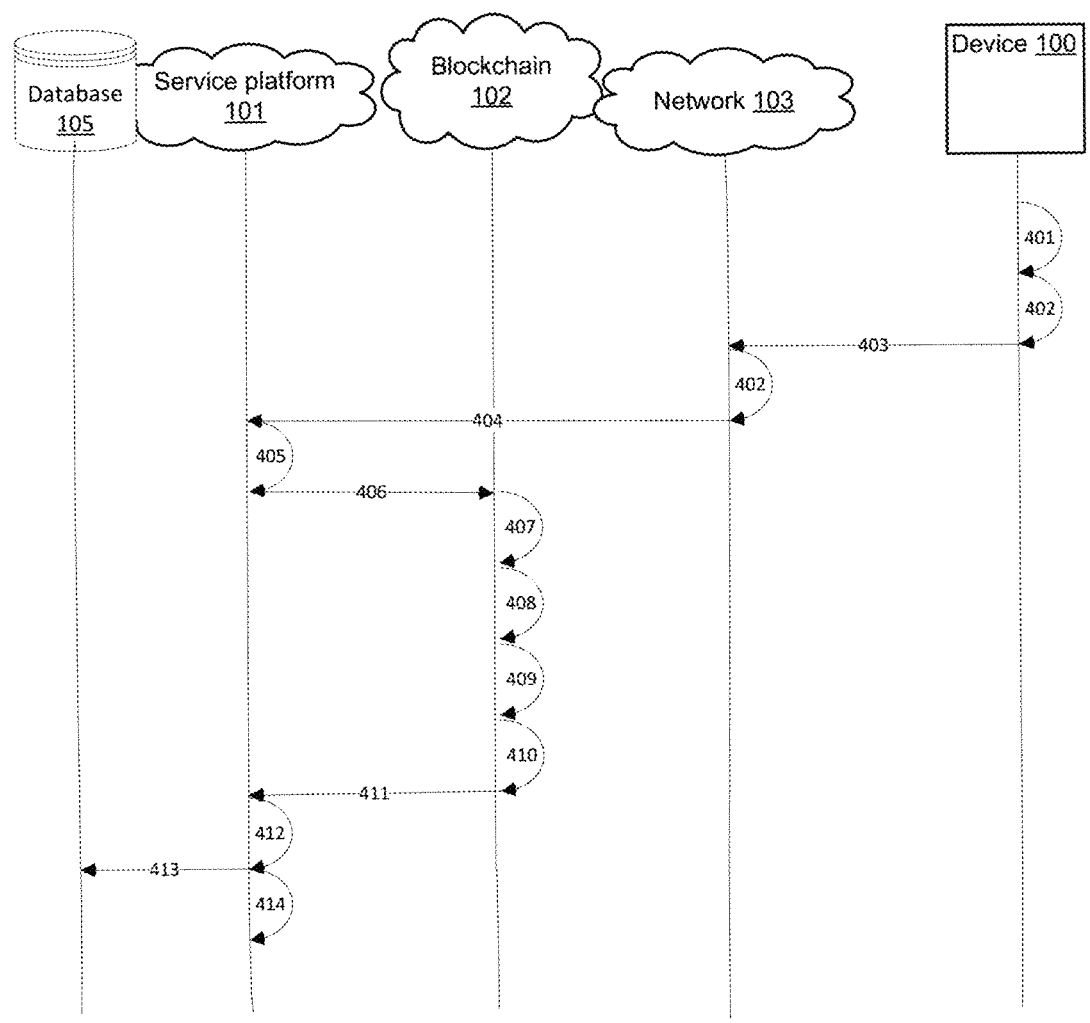
FIG. 4 shows the steps of a method according to the invention implemented in the system of FIG. 1, during a third phase of the invention.

FIG. 4 shows the steps of a method according to the invention implemented in the system of FIG. 1, during a third phase of the invention.

The third phase corresponds to an operating phase during which the device 100 tries to upload data in the blockchain 102.

At step 401, the device 100 obtains data. For example, in the case where the device 100 is a sensor, the device 100 senses data related to its environment.

At step 402, the device 100 generates a message. The message may comprise, in a header for example:
 the device identifier;
 a network identifier of the intended recipient, i.e. of the service platform 101.
 a network key, which is provided by a network provider in a preliminary phase;
 and
 the firmware details.

In addition, the payload of the message comprises the data encrypted using the private key.

The generated message is transmitted at step 403 to the network 103. At step 404, the network checks that the network key comprised in the message is correct. If so, a time stamp may be added in the header of the message and the message is forwarded to the intended recipient, i.e. the service platform 101.

Upon reception of the message, the service platform 101 checks the device identifier and retrieves manufacturing information associated with it in the database 105. The message is enriched with the manufacturing information and the message is forwarded to the blockchain 102 at step 406, contrary to the solutions of the prior art where the message is decrypted by the service platform 101. In complement, the service platform 101 may add, at step 405, a platform security key in the header of the message before forwarding it to the blockchain 102.

Upon reception of the message, the blockchain platform 104 accesses the data using the decryption means. Using the decryption means may involve performing the following steps (or only one or some of the following steps):

step 407: the blockchain platform 104 verifies the platform security key comprised in the message. If the platform security key is correct, the blockchain platform 104 performs step 408. Else, the message may be cancelled and an alarm may be generated;

step 408: the blockchain platform 104 builds a current signature based on elements of the message such as for example the firmware details, on the manufacturing information (included in the message by the service platform 101) and on the unique code. The elements of the message may designate any information comprised in a header of the message. The signature may be alternatively based on only some of the above information, which reduces the level of security tied to the method, but remains compatible with the invention. The signature is then hashed and compared with the hashed signature stored in the blockchain in association with the device identifier. If the hashed signatures correspond to each other, the blockchain platform 104 performs step 409. Else, the message may be cancelled and an alarm may be generated. If step 408 is performed, then the signature is part of the decryption means;

step 409: the payload of the message is decrypted using the public key corresponding to the private key. The decrypted data is then hashed and added in the blockchain 102. The public key is part of the decryption means.

At step 410, the blockchain platform 104 encrypts the data using the virtual encryption key and modifies the message based on the newly encrypted data. The modified message is then transmitted to the service platform 101 at step 411.

Upon reception of the message, the service platform 101 checks the device identifier at step 412 and retrieves, at step 413, the associated virtual decryption key stored at step 207 of FIG. 2 in the database 105. Based on the retrieved virtual decryption key, the service platform 101 decrypts the encrypted data at step 414.

At step 415, the service platform 101 may use the decrypted data to trigger notifications/alerts, based on a comparison of the data with a threshold value for example. Alternatively, or in complement, the service platform 101 may store the data in the database 105 in the user account.

Compared with the solutions of the prior art, the present invention proposes to decrypt data at the blockchain 102 first, and then to feedback the data to the service platform 101, the data being encrypted by the blockchain so that only the service platform can decrypt it, which ensures integrity and authenticity for the service platform 101 and for the blockchain 102.

Also, as described above, the encryption key (private key for example) of the device 100 is issued from a computational algorithm of the blockchain platform 104, and is hashed in the blockchain 102.

In addition, manufacturing information such as barcode, manufacturing date and time and firmware version number are fed back to the blockchain 102 to be hashed and stored. This information is almost impossible to detect/uncover/guess for an attacker trying to hack the data to be transmitted to the blockchain 102.

As the device identifier, the manufacturing information and the decryption key are linked in the blockchain 102, there is no repository having a pre-stored decryption key and there is no way to access to this information.

The invention therefore guarantees that the data collected from the devices is trusted and has not been modified by any intermediate platform or by the service platform 101.

Figure 5:
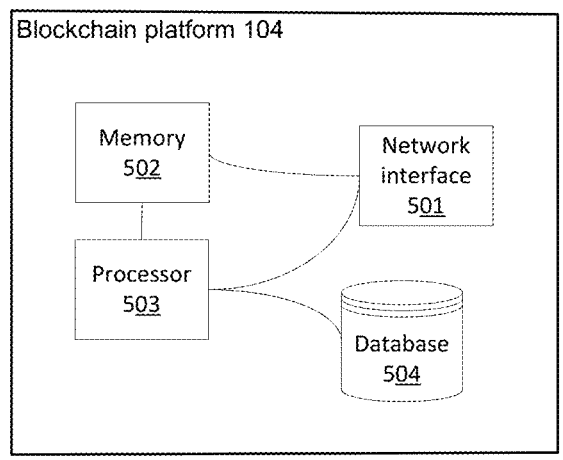
FIG. 5 shows a structure of the blockchain platform according to some embodiments of the invention.

FIG. 5 shows a structure of the blockchain platform 104 according to some embodiments of the invention.

As explained, the blockchain platform 104 may be seen as an interface between the service platform 101 and the blockchain 102. The blockchain platform 104 may be one of the nodes storing the blockchain 102.

The blockchain platform 104 comprises a memory 502 such as a RAM and a processor 503 arranged for executing instructions for implementing the steps of FIGS. 2 to 4 that involve the blockchain platform 104.

The blockchain platform 104 further comprises a database 405, which can comprise both an off-chain database and an on-chain database (comprising data that is shared with the other nodes of the blockchain 102). The database is configured for storing some of the data used during execution of the method according to the invention. In particular, while not exclusively, the database 405 may store the decryption means in association with the respective device identifiers. Also, the database 405 may store the manufacturing information and the unique codes in association with the respective device identifiers.

The blockchain platform 104 further comprises a network interface 501 arranged for enabling communications through a network such as an IP network for example. The network interface enables in particular to communicate with the device manufacturer 120, with the mobile terminal 107 and with the service platform 101.

Further aspects related to the invention are described hereafter.

As already explained, a smart contract refers to a contract between peers that is stored in the blockchain so as to ensure that the contract cannot be modified and which may comprise triggering conditions that automatically activate some terms of the contract.

According to the prior art, a maintenance work order is triggered manually or semi-automatically and then assigned to a concerned maintenance person (for example for mechanical or electrical maintenance).

Once maintenance is performed, details of the maintenance (of the performed operations) may be updated in a software such as a Computerized Maintenance Management System, CMMS, software. CMMS is a software used for maintenance activities. According to the current use of CMMS, all the details need to be manually input or in very rare cases, in a semi-automatic way.

Time required for maintenance activity is also logged in the CMMS software.

In parallel, ERP (Enterprise Resource Planning) is a software used to manage third parties involved in maintenance. The third parties are registered in the ERP with their detail invoice and bank details. It may be interacting directly with the CMMS software.

Regarding invoicing, it is performed manually or through an IT system separately.

Service Level Agreement, SLA, designates a contract between a service provider (a maintenance operator) and an end user that defines the level of service expected from the service provider. In case of SLA, interruption of work is monitored and in case where maintenance is not performed in the time specified in the SLA, a penalty is imposed to the maintenance operator.

This leads to introduce many delays in the maintenance process, which leads to reduce efficiency of the system to which the maintenance is applied.

As a summary, the maintenance process according to the prior art comprises the following operations:

when a machine stops working, a machine operator calls the maintenance supervisor, or fills a maintenance paper form to be communicated to the maintenance supervisor;

the maintenance supervisor manually creates a work order and assigns it to the concerned maintenance engineer;

the maintenance engineer does the maintenance by repairing or replacing the machine or some parts of it. It may imply using advanced technologies to implement remote help such as augmented reality connected to remote expert, or remote access using VPN or other similar technologies, to guarantee the SLA;

the maintenance supervisor enters the maintenance details in CMMS when the maintenance work has been performed, to inform a finance or ERP manager, by email or phone (or eventually through a CMMS-ERP interface) to start the payment of the $3^{rd}$ party maintenance subcontractor; and the ERP or finance manager creates the payment invoice to close the maintenance process.

However, this process involves too many manual entries, which leads to potential errors and delays in the maintenance and payment process.

The following operations may be implemented in the context of the invention described with reference to FIGS. 1 to 5, or independently.

Figure 6:
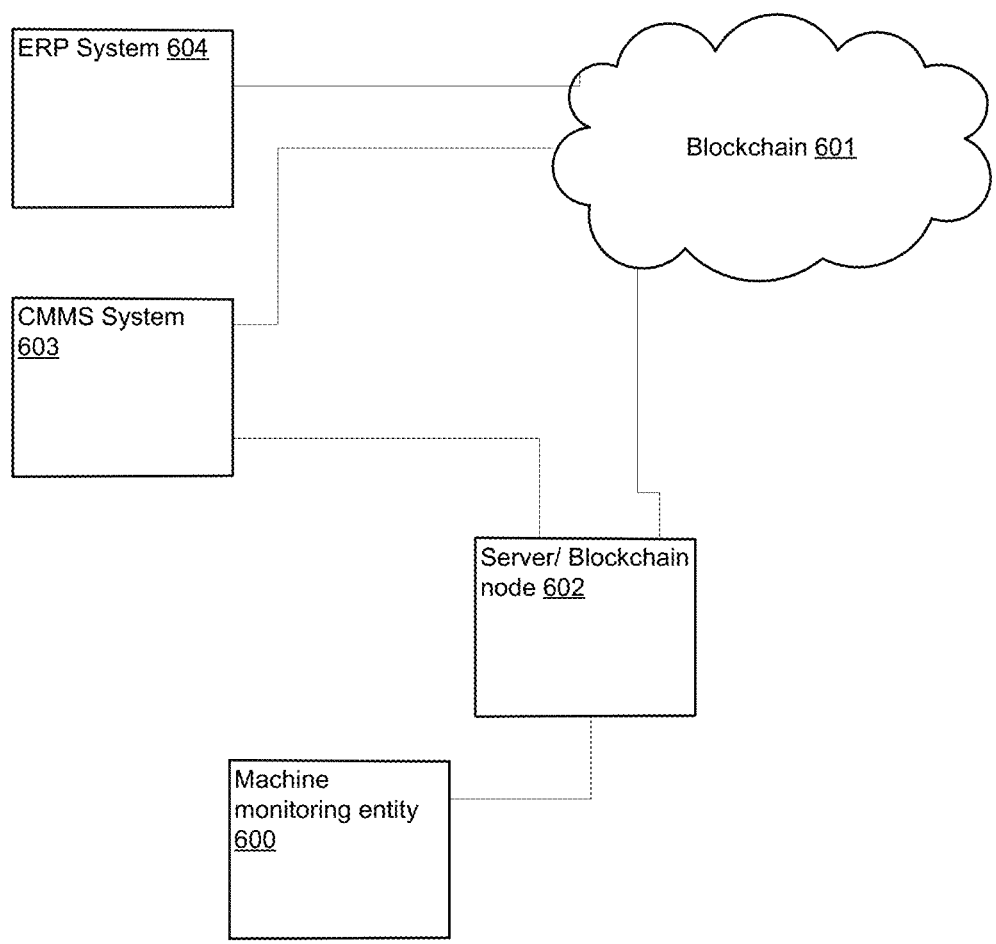
FIG. 6 shows a system according to further aspects of the invention.

Referring to FIG. 6, there is shown a system according to further aspects of the invention.

The system comprises at least one machine monitoring entity 600. The sensor 600 may comprise the functionalities of the device 100 previously described. The machine monitoring entity 600 may be tied to a particular machine and encompasses any entity or device that is able to capture the state of a machine, such as stopped, running, ready, interlocked, out of service, under maintenance, or that can capture data related to the machine. To this end, the machine monitoring entity 600 may be a sensor, such as an IIOT sensor, an edge control gateway, a Programmable Logic Controller, PLC, a Human-Machine Interface, HMI or any other industrial device that is able to capture data related to the machine. Several machine monitoring entity 600 may be tied to the machine, so as to detect when maintenance is required for the machine. In what follows, the example of a sensor is used, for illustrative purpose only.

The sensor 600 stores a machine identifier and optionally a user identifier identifying the user or the company owning the machine. The sensor 600 may also detect when maintenance is started or when maintenance ends. No restriction is attached to the type of sensor 600, which may be a temperature sensor, an electrical sensor (sensing the current or the voltage supplied to the machine), a pressure sensor, etc. Through PLC and time stamping, it is also possible to capture the time duration from the start of the maintenance to the completion of the maintenance, either at the edge (local blockchain node 602 described hereafter) or at the PLC level.

Detection that maintenance is required may be based on a comparison of a sensed value with a predefined threshold. It may also enable to calculate the time duration between the request for maintenance order and the start of the maintenance.

The sensor 600 is configured to communicate with a local blockchain node 602 which can be hosted in a local control station, located in the same premises as the machine for example (in a factory for example).

The blockchain node 602 is configured to communicate with the other nodes of the blockchain, i.e. with the blockchain 601, which may comprise the blockchain platform 104 that has been previously described. The blockchain node 602 can process data that can be added to the blockchain (on-chain data) but also data that is not publicly shared in the blockchain (off-chain data).

The blockchain node 602 is also configured to communicate with a CMMS system 603. The CMMS system encompasses any system that hosts a maintenance software such as a CMMS software. The CMMS system 603 is also configured to communicate with the blockchain 601.

The system also comprises an ERP system 604. The ERP system 604 encompasses any system that hosts a software used to manage third parties involved in maintenance. The ERP system 604 is configured to communicate with the blockchain 601.

In what follows, it can be considered that the machine and the sensor are parts of an airport, and therefore, that the CMMS system 603 and the ERP system 604 are respectively an airport CMMS system and an airport ERP system.

Figure 7:
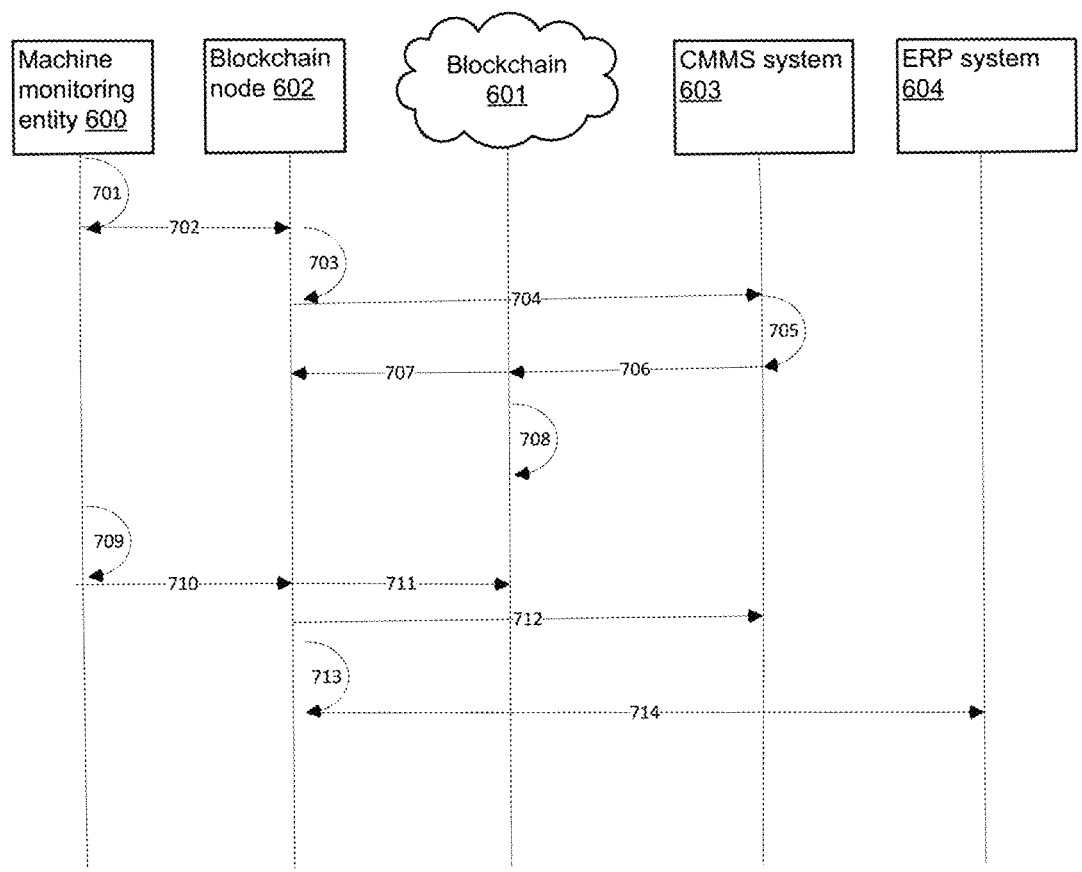
FIG. 7 shows the steps of a method according to further aspects of the invention.

FIG. 7 is a flowchart showing the steps of a method according to further aspects of the invention.

At step 701, the sensor 600 senses data related to a machine and the data is communicated to the blockchain node 602 at step 702. The data may be communicated with an identifier of the sensor and/or an identifier of the machine.

At step 703, the blockchain node 602 is configured to, based on the received data, create a request for work order. The request for work order may also, alternatively or in complement, be created upon activation of a push button. This enables the sensed data to be manually validated by a machine operator. The push button may be a Low Power Wide Area, LPWA, push button, which may be unlocked by the machine operator using a badge or his fingerprint to authenticate before requesting or allowing the work order.

The request for work order comprises at least the machine identifier. The machine identifier may be derived from the identifier received from the sensor 600. In complement, the request for work order may comprise a user identifier. The request for work order may also be time stamped.

At step 704, the blockchain node 602 transmits the request for work order to the CMMS system 603.

At step 705, a work order is then created by the CMMS system, and submitted to a maintenance operator such as a CMMS operator, which may acknowledge/validate the work order to the blockchain node 602, at step 706, and assign a severity level to the work order.

At step 707, a smart contract generator in the blockchain node 602 may create a smart contract in the blockchain 102 corresponding to the work order, based on any combination of the following triggering conditions:

IoT push button and secondary sensor input;
a threshold alert from a Supervisory Control And Data Acquisition SCADA, system;
a "Machine out of service" status issued from PLC;
validation of the work order by the CMMS system 603;
a preventive maintenance alert from SCADA or a condition monitoring system;
and
a scheduled maintenance based on run hour of machine.

The smart contract may be based on:
the machine identifier,
a machine operator identifier,
time (of the work order or of the request for work order);
duration of the maintenance;
compliance rule automatically captured from a digital copy of SLA;
type of maintenance: onsite, remote, augmented reality, etc.;
steps of maintenance and steps to follow;
parties involved in the maintenance (OEM, service provider, insurance agency); and
service request (high, medium, low).

The smart contract is then shared between all the nodes of the blockchain 601, including the blockchain node 602, in accordance with the blockchain technology.

The smart contract in the blockchain 601 may be updated with details regarding the maintenance. These updates may be manually performed by the maintenance operator, or can be based on data retrieved from the sensors 600. Data collection from sensors 600 may be based on the method described with reference to FIG. 4. Date retrieved from sensors 600 may be pushed directly to the blockchain 601 via the local control station 602 without transiting through the CMMS system 603.

The details of the smart contract are hashed in the blockchain 601 at step 708 and the smart contract may be an electronic passport. The smart contract may be updated during the maintenance with data that is time stamped and hashed in the smart contract, so as to ensure that all the steps of the maintenance are followed in due time. This can enable to check if all steps are followed or not, the time used for the maintenance, the starting date and completion date of the maintenance. If there is any delay in performing the maintenance, a penalty may be imposed based on SLA.

The sensor 600 may detect that the machine is repaired and goes back to its working state at step 709. To this end, the sensor 600 may be an energy/current sensor, sensing for example that the machine is turned on. Other types of sensors may detect that a machine is repaired and back to its working state. For example, a contact sensor (mechanical) may detect that a machine is again located at its working position.

The data detected by the sensor 600 at step 709 may be transmitted to the blockchain 601 and to the CMMS system 603, via the blockchain node 602 at steps 710, 711 and 712. The data added to the blockchain 601 may be time stamped.

A smart contract settlement engine of the blockchain node 602 may check the closing conditions of the smart contract and the information listed below to settle the contract, at step 713:
 work order is closed in CMMS;
 no error, interlock or threshold alert in the SCADA;
 machine status set to "ready", "idle" or "running", from the PLC;
 secondary IoT current/energy sensor value; and
 percentage of steps followed during maintenance.

The settled smart contract may be forwarded to the ERP system at step 714.

In case of conflict in the SLA, the smart contract is shared between all the stake holders and is used as reference (as "truth"). A penalty may therefore be imposed if the SLA has been violated.

In a multi-stake holder maintenance environment, in which several parties are responsible for a single maintenance operation tracked through a smart contract, the smart contract is used to decide the payment amount to each party in a more transparent way. Indeed, the smart contract predefined the compliance rules in advance, based on SLA, and if a procedure is not followed or maintenance has been performed according to a low priority, then the smart contract may reduce the payment during settlement and details are shared with all the parties involved.

According to further embodiments, performance ratings can be transmitted from the sensors 600 to the machine and to the maintenance engineer automatically.

Also, based on the data retrieved by the sensors 600 at step 701, an alert can be issued indicating whether to repair or replace a given machine, based on a given algorithm and based on history data.

Also, these further aspects of the invention may be used to suggest improvements in the SLA based on the smart contract settlement history.

In view of the above, a further aspect of the invention concerns a method for generating a smart contract in a blockchain, the method comprising the following operations:
 upon reception of data from at least one machine monitoring entity, generating a request for maintenance work order and transmitting the request to a maintenance operator system, said request comprising at least a machine identifier;
 upon reception of the request by the maintenance operator system, creating a maintenance contract based on the machine identifier and storing said maintenance contract in the blockchain.

Another aspect of the invention concerns a non-transitory computer readable storage medium, with a program stored thereon, said program comprising instructions for implementing the operations of the method according to the preceding aspect of the invention.

Still another aspect of the invention concerns a system for generating a smart contract in a blockchain, comprising:
 a machine monitoring entity comprising unit configured for capturing data related to a machine and comprising an interface configured for transmitting said data with a machine identifier to a local control station;
 the local control station, comprising an interface for receiving the data and the machine identifier, a processor for generating a request for maintenance work order based on the machine identifier, and a network interface configured for transmitting the request for maintenance work order to the maintenance operator system;
 the maintenance operator system comprising a first interface for receiving the request for maintenance work order, a processor for generating a maintenance contract based at least on the machine identifier, and a second interface for storing the maintenance contract in the blockchain.

These further aspects of the invention enable to automatically create a smart contract based on a maintenance work order of the CMMS system. Complete maintenance compliance rule is monitored through smart contract. All the details are hashed in the blockchain from the start of the maintenance to its end. If the maintenance operations are completed within a specified time and the machine is operational again, an invoice may be triggered automatically by the ERP system based on the smart contract.

Payment to each of the stake holders of the maintenance process is done based on a predefined maintenance contract and/or performance based on the service (for example if not all the steps of the maintenance have been validated or if a priority level lower than the pre-fixed priority level has been used during maintenance). The maintenance activities are stored in the form of an electronic passport that is hashed in the blockchain. This electronic passport is considered as a unique truth by all the stake holders in case of penalty or litigation.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for processing data in a blockchain, the method comprising the following steps carried out by a blockchain platform:
 storing a list of device identifiers and associated respective decryption means;
 receiving a message comprising first encrypted data and a first device identifier;
 decrypting the first encrypted data using first decryption means that are associated with the first device identifier;

hashing the first decrypted data and storing the hashed data in the blockchain together with the first device identifier;
prior to the step of storing the respective decryption means:
receiving the list of device identifiers;
hashing the device identifiers of the list; and
storing the hashed device identifiers in the blockchain; and
upon reception of the list of device identifiers:
generating, for at least one device identifier of the list, at least one encryption key;
transmitting said encryption key and given device identifier to a device manufacturer so as to be stored in a firmware of a device corresponding to the given device identifier during manufacturing of said device; and
generating, for each given device identifier of the list, the decryption means based at least on the encryption key corresponding to said given device identifier.

2. The method according to claim 1, wherein the first encrypted data is received from a service platform and wherein the method further comprises:
secondly encrypting the first decrypted data using a virtual encryption key; and
transmitting the secondly encrypted data with the first device identifier to the service platform.

3. The method according to claim 2, wherein the method further comprises the following steps, prior to the step of receiving the first encrypted data:
generating the virtual encryption key and a corresponding virtual decryption key for each device identifier of the list; and
transmitting the virtual decryption keys in association with the respective device identifiers to the service platform.

4. The method according to claim 1, further comprising transmitting the list of device identifiers to the service platform.

5. The method according to claim 1, comprising, prior to the step of storing decryption means:
receiving from a device manufacturer a request for a unique code corresponding to a given device identifier;
hashing the given device identifier and verifying that the hashed device identifier corresponds to one of the hashed device identifiers stored in the blockchain;
if the hashed device identifier corresponds to one of the hashed device identifiers stored in the blockchain, generating a unique code corresponding to the given device identifier;
transmitting the unique code to the device manufacturer; and
hashing the unique code and storing the hashed unique code in the blockchain in association with the hashed device identifier.

6. The method according to claim 5, further comprising, after the step of hashing the unique code and before receiving the message:
receiving, from a mobile application, a scan of a current unique code printed on a device;
hashing the unique code and verifying that the hashed current unique code corresponds to one of the hashed unique codes stored in the blockchain in association with a given device identifier; and
if the hashed current unique code corresponds to one of the hashed unique codes stored in the blockchain in association with a given device identifier, generating a signature associated with the given device identifier based at least on the unique code, hashing said signature and storing the hashed signature in the blockchain, the hashed signature being part of the decryption means.

7. The method according to claim 6, wherein a firmware version number is received from the mobile application with the scan of the current unique code and wherein the signature is generated based at least on the unique code and the firmware version number.

8. The method according to claim 6, further comprising receiving manufacturing information from a manufacturer of the device, hashing the manufacturing information and storing the hashed manufacturing information in association with the device identifier in the blockchain, wherein generating the signature is further based on manufacturing information of the device.

9. The method according to claim 8, further comprising, after receiving the manufacturing information from the manufacturer:
receiving a request to link a device to a user account, the request comprising current manufacturing information and a device identifier from an application scanning a packaging of the given device;
hashing the current manufacturing information; and
if the hashed current manufacturing information corresponds to the hashed manufacturing information stored in association with the device identifier in the blockchain, linking the device identifier with the user account in the blockchain.

10. The method according to claim 6, wherein decrypting the first encrypted data using the decryption means comprises:
generating a current signature based on at least one element of the message comprising the first encrypted data;
hashing the current signature; and
decrypting the first encrypted data in the message only if the hashed current signature matches with the hashed signature previously stored in association with the first device identifier in the blockchain.

11. The method according to claim 10, wherein the current signature is further generated based on the manufacturing information and/or the unique code stored in association with the first device identifier in the blockchain.

12. A computer program product comprising a non-transitory computer-readable medium having processor executable instructions stored thereon, which when executed by a processor, causes an apparatus to perform the method according to claim 1.

13. A blockchain platform comprising:
a database storing respective decryption means in association with device identifiers;
a network interface configured for receiving encrypted data with a first device identifier; and
a processor configured for
decrypting the encrypted data using the decryption means associated with the first device identifier in the database;
hashing the first decrypted data and storing the hashed data in the blockchain together with the first device identifier;
prior to storing the respective decryption means:
receiving the list of device identifiers;
hashing the device identifiers of the list; and
storing the hashed device identifiers in the blockchain; and upon reception of the list of device identifiers:
  generating, for at least one device identifier of the list, at least one encryption key;
  transmitting said encryption key and given device identifier to a device manufacturer so as to be stored in a firmware of a device corresponding to the given device identifier during manufacturing of said device; and
  generating, for each given device identifier of the list, the decryption means based at least on the encryption key corresponding to said given device identifier.

* * * * *